United States Patent [19]
Hanna

[11] Patent Number: 6,002,990
[45] Date of Patent: Dec. 14, 1999

[54] DYNAMIC WAVELENGTH CALIBRATION FOR SPECTROGRAPHIC ANALYZER

[75] Inventor: D. Alan Hanna, Boulder, Colo.

[73] Assignee: Datex-Ohmeda, Inc., Louisville, Colo.

[21] Appl. No.: 08/951,934

[22] Filed: Oct. 16, 1997

[51] Int. Cl.$^6$ .................................................. G01N 21/25
[52] U.S. Cl. .............................................. 702/88; 702/22
[58] Field of Search .............................. 702/22–24, 27, 702/28, 32, 85–88, 99, 106, 98; 356/300–306, 309

[56] References Cited

U.S. PATENT DOCUMENTS

| | | |
|---|---|---|
| Re. 34,153 | 12/1992 | Benner et al. . |
| 4,756,670 | 7/1988 | Arai . |
| 4,859,858 | 8/1989 | Knodle et al. . |
| 4,859,859 | 8/1989 | Knodle et al. . |
| 5,046,018 | 9/1991 | Flewelling et al. . |
| 5,095,913 | 3/1992 | Yelderman et al. . |
| 5,166,755 | 11/1992 | Gat ......................................... 250/226 |
| 5,231,591 | 7/1993 | Flewelling et al. . |
| 5,313,406 | 5/1994 | Kauppinen et al. ..................... 250/341 |
| 5,332,901 | 7/1994 | Eckles et al. ........................... 250/340 |
| 5,510,269 | 4/1996 | Black et al. . |
| 5,710,713 | 1/1998 | Wright et al. ........................... 250/282 |

OTHER PUBLICATIONS

Dally et al., Instrumentation for Engineering Measurements, pp. 17–20, Dec. 1993.

*Primary Examiner*—Marc S. Hoff
*Assistant Examiner*—Craig Steven Miller
*Attorney, Agent, or Firm*—Holme Roberts & Owen LLP

[57] ABSTRACT

A novel process is disclosed for continually or periodically correcting gas spectrometer measurements for wavelength calibration drift without interrupting the gas measurement process. The spectrometer employs certain calibration vectors for use in obtaining single component information based on a composite measurement for a multi-component gas sample. A calibration vector can be provided for each component of interest as well as an average spectrum and other spectra as desired. These calibration vectors are used to selectively compensate for spectral interference between the multiple components so as to effectively isolate and measure a selected spectral characteristic for a particular component of interest. Temperature changes and attendant variations in spectrometer dimensions or other temperature related factors can degrade measurement performance. The novel process involves deriving wavelength correction data for the spectrometer as a function of temperature, monitoring the spectrometer for temperature changes during a time period of interest, and adjusting or shifting one or more of the calibration vectors to compensate for temperature variations. By performing temperature-related adjustments based on the calibration vectors, the computational intensity of the process is greatly reduced, thereby minimizing processor burden/requirements. It is anticipated that the correction process can be continually executed as a low priority or background function in a multitasked system without requiring dedicated processor resources.

26 Claims, 6 Drawing Sheets

DYNAMIC WAVELENGTH CALIBRATION FOR SPECTROGRAPHIC ANALYZER

FIELD OF THE INVENTION

The present invention relates to instruments for performing spectrographic analyses of multi-component samples including spectrographic gas analyzers for medical and non-medical applications. In particular, the present invention relates to a process for dynamically calibrating such an instrument so as to compensate for variations in a system parameter or parameters that may affect measured values. The invention is particularly apt for correcting for temperature-related drifting of spectrometer wavelength calibration.

BACKGROUND OF THE INVENTION

Spectrographic analyzers are used in a variety of medical and industrial applications to analyze the composition of a gaseous or fluid sample. One such application is the use of a spectrographic gas analyzer to monitor respiratory, anesthetic and/or other therapeutic gases in a patient respiratory flow line during a medical procedure. The operation of such analyzers typically involves illuminating a sample gas, measuring the illumination intensity, or other value related to the illumination transmitted through the sample gas, at various wavelengths, and analyzing the measured values based on known transmission/absorption/scattering characteristics of the components of interest to determine the composition of the sample gas, e.g., the concentration of components of interest in the sample gas. The number of wavelength measurements employed can vary depending on system requirements, but is generally at least as great as the number of components to be analyzed. The set of wavelength-related measurements for a given sample gas may be considered a composite measured spectrum.

The process for deriving individual component information from the composite measured spectrum involves isolating effects due to the component or components under analysis. In this regard, it will be appreciated that various interfering components of the sample gas may have overlapping effects such that the measured value at a given wavelength may reflect effects due to more than one component. The process for deriving individual component information from the composite measured spectrum is well known in the prior art, and involves the derivation of "calibration vectors" which can be used to calculate the concentration of individual components of the sample mixture. In general, there is one calibration vector for each component to be measured, and the measurement produced using each calibration vector will respond only to the presence of a single component of the sample mixture. The process for deriving individual component information therefore involves at least a composite measured spectrum and one or more vectors.

In order to obtain reliable information, it is important for the spectrometer to be carefully calibrated. Such calibration involves, inter alia, establishing and maintaining a known relationship between particular measured values and corresponding wavelengths such that the composite measured spectrum can be properly processed using the predetermined vectors. It is known that various factors can affect this relationship depending on the particulars of the equipment. For example, a change in temperature may result in a slight change in instrument geometry or dimensions which, in turn, may cause a wavelength shift in the composite measured spectrum unrelated to the composition of the sample gas. Such a shift, if not accounted for, introduces an element of error into the system and could result in significant hazards, particularly in medical applications.

Two general approaches to addressing this source of potential error are measurement drift prevention and measurement drift correction. Measurement drift prevention attempts to avoid drift by maintaining temperature or other parameters at a constant value. However, this approach requires careful monitoring and control which increases instrument complexity and can be impractical. Measurement drift correction attempts to identify a drift of the composite measurement spectrum due to temperature or other parameters, and then correct the composite measurement spectrum based on the identified drift. This approach, however, generally involves substantial processing and dedicated processor resources, particularly in applications involving high measurement rates and multiple interfering components where the composite measurement spectrum may have a complex form. These approaches have thus resulted in substantial instrument complexity, processing complexity and/or processor requirements.

SUMMARY OF THE INVENTION

The present invention is directed to a process for dynamically calibrating a spectrographic analyzer so as to allow for accurate multi-component sample analysis without the need to wholly prevent wavelength drift or to adjust the composite measured spectrum to account for drift. That is, the process of the invention operates on an uncorrected composite measured spectrum in a manner that yields accurate information regarding the composition of the multi-component sample. The process involves adjusting a vector or vectors based on an identified parameter value or parameter variation, and processing the composite measured spectrum using the adjusted vector(s) in a manner that yields composition information largely independent of the position of the measured spectrum and vector(s) relative to a wavelength range or corresponding measurement field. The invention can be broadly viewed as encompassing two aspects: (1) determining a relationship between wavelength drift and variation of a system parameter and monitoring an instrument for wavelength drift, and (2) using this relationship and an identified drift to adjust a vector or vectors and process the composite measured spectrum.

According to the first of these aspects, a relationship between measured wavelength drift and variation of a system parameter can be determined empirically. It should be noted that this "wavelength drift" does not actually represent a change in illumination phenomena but, rather, reflects changes in measured values due to characteristics of the measurement equipment substantially independent of the illumination source and sample composition. The wavelength drift relationship is determined empirically by successively operating the instrument at various values of the parameter to be characterized (e.g., at various temperatures) and identifying a spectral characteristic (e.g., a peak intensity) associated with a known wavelength value. Once this relationship is established, the same spectral characteristic can be monitored continually or periodically at a time of interest relative to a sample measurement to identify a wavelength drift or, alternatively, the parameter can be directly monitored.

The particulars of this process can vary depending on the nature of the spectrographic analyzer employed. In the case of laser-based or Raman spectrometers, a laser main line or plasma glow line can be employed for wavelength calibration. Such spectrometers operate on a scatter principle, i.e., they are based on an understanding that information regarding the composition of a sample can be determined based on a direct or indirect analysis of laser illumination scattered by the sample. Raman spectrometers therefore define at least one main lasing wavelength and, in the case of gas lasers, a number of plasma glow lines having known wavelength characteristics. Such laser-related spectral phenomena can be used for wavelength calibration prior to and during a measurement process as described above. The plasma glow lines provide a particularly useful reference for calibration purposes because particular lines can generally be identified that are free from interference by sample fluid spectral lines. These glow lines can be monitored without interrupting the measurement process and without complex processing to distinguish glow line effects from sample fluid effects. In other types of spectrometers, a known spectral characteristic such as a peak associated with a fluid component can be monitored for calibration purposes.

According to the second aspect of the present invention as identified above, a method is provided for compensating for variations in an instrument parameter by adjusting a calibration vector or vectors. The process includes the steps of obtaining a calibration vector for at least one component of interest relative to a multi-component sample, deriving wavelength correction data as a function of a selected parameter for the instrument, and monitoring the instrument relative to the selected parameter. In the case of a Raman spectrometer, these steps may involve the use of a laser main line or plasma glow lines as described above. In other embodiments, for example, linear variable filter (LVF) spectrometers, these steps may involve identifying or monitoring particular characteristics of spectra during calibration or measurement processes. The calibration vector is adjusted using the correction data based on a monitored value of the selected parameter. This adjusted vector is then employed to obtain information regarding the composition of the multi-component sample.

In one implementation of the present invention, an LVF based gas analyzer for monitoring respiratory and anesthetic gases is dynamically calibrated to compensate for changes in spectrometer temperature. The gas analyzer includes a number of sensors associated with the LVF such that the sensors provide measurements over a wavelength range, i.e., the sensors define a measured spectrum. Calibration vectors for various anesthetic agents and other components of interest (and an average spectrum or other spectra as desired) and temperature related correction data are empirically derived based on measurements (i.e., spectra) obtained under known conditions. The spectrometer temperature is then monitored continuously or periodically during a medical procedure. The temperature can be monitored directly by a sensor in the spectrometer or indirectly by monitoring shifts of known characteristics of the measured spectrum (e.g., movement of a carbon dioxide line). During the medical procedure, the analyzer is operated in conventional fashion to obtain measured spectra for use in monitoring the components of interest. These measured spectra are processed using the calibration vectors as adjusted based on the monitored temperature and derived correction data to obtain corrected calibration vectors. These corrected calibration vectors are then used in the normal fashion to obtain information regarding the composition of the sample gas. The process of correcting the measurement vectors is preferably executed as low priority or background function in a multitasked system, thus reducing or eliminating the need for dedicated processor resources. In this manner, accurate composition information is obtained despite temperature fluctuations without shifting the measured spectra, thereby reducing the computational complexity of the process and minimizing processor burden/requirements.

BRIEF DESCRIPTION OF THE DRAWINGS

For a more complete understanding of the present invention and further advantages thereof, reference is now made to the following Detailed Description, taken in conjunction with the drawings, in which.

DETAILED DESCRIPTION OF THE INVENTION

The present invention is directed to a process and related structure for dynamically calibrating a spectrographic instrument to account for variations of a system parameter affecting wavelength related measurements. Such instruments are useful in a variety of medical and industrial applications including, for example, monitoring administration of respiratory and anesthetic or therapeutic gases to patients and industrial effluent analysis. One system parameter that can affect instrument performance is temperature. In the following description, the invention is set forth in the context of dynamic temperature related calibration of gas analyzers for monitoring a patient respiration line during a medical procedure. The present invention has particular advantages for this application due to the critical accuracy concerns and unpredictable temperature fluctuations characteristic of the medical environment. However, it will be appreciated that various aspects of the present invention are applicable to other systems and applications.

Figure 1:
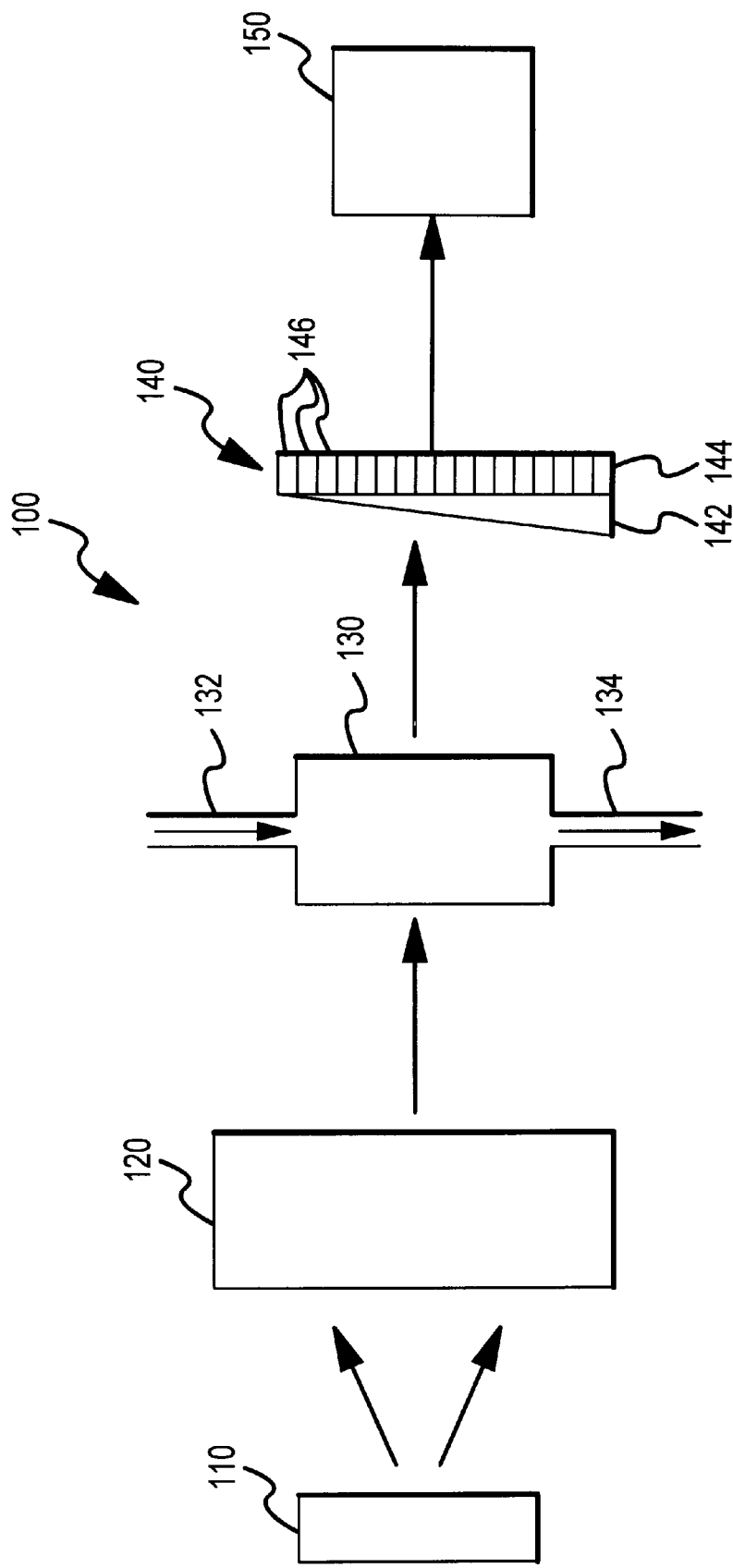
FIG. 1 is a schematic diagram depicting an LVF spectrographic gas analyzer in connection with which the present invention can be implemented.
Figure 2:
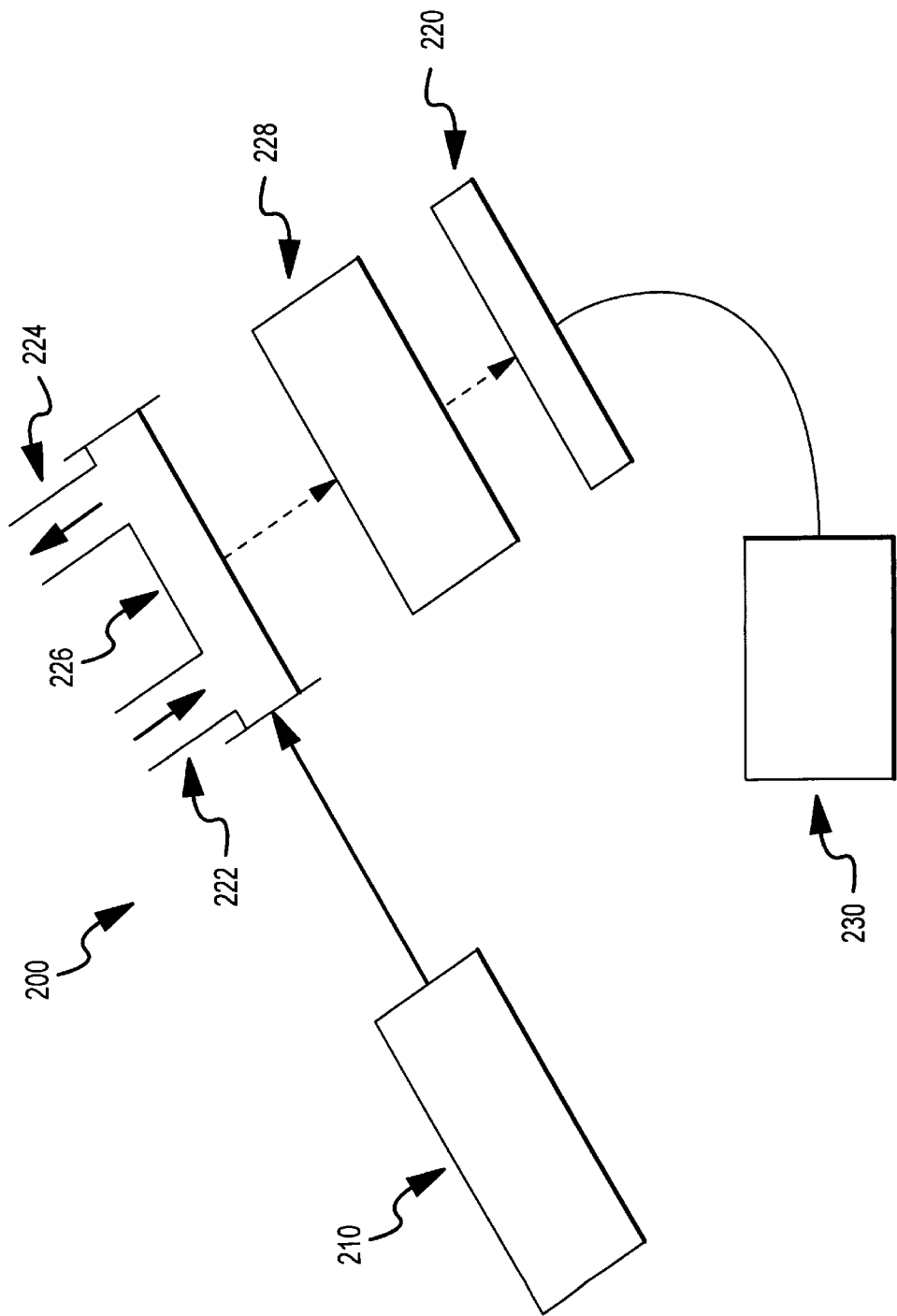
FIG. 2 is a schematic diagram depicting a Raman spectrographic gas analyzer in connection with which the present invention can be implemented.

FIGS. 1 and 2 are schematic diagrams showing two types of gas analyzers that are used to monitor the administration of gases to a patient during medical procedures. In particular, FIG. 1 shows an LVF spectrographic gas analyzer and FIG. 2 shows a Raman spectrographic gas analyzer.

Such gas analyzers are commonly used to monitor a variety of components in the patient respiratory stream including, for example, oxygen, carbon dioxide ($CO_2$), Isoflurane, Enflurane, Haloflurane, Desflurane, and Sevoflurane. The implementation of the present invention may vary in some respects depending on the type of spectrographic instrument employed. The instruments of FIGS. 1 and 2 are provided as two examples and it will be appreciated that the invention can be implemented in other systems with appropriate modifications.

Referring to FIG. 1, the LVF spectrographic gas analyzer is generally identified by the reference numeral 100.

Generally, the analyzer 100 includes an illumination source 110, optics 120 for directing illumination from the source through a sample chamber 130 to a detector surface, a filter/detector unit 140 and a processor 150. Additional components of the analyzer 100 that are not relevant to the present description, e.g., housings, any reference gas chambers and associated flow lines and optical choppers, have been omitted for purposes of clarity.

The source provides illumination of a spectral range sufficient to derive composition information for the components of interest of the sample gas. In the illustrated embodiment, source 110 emits infrared illumination across a wavelength range of at least about 4–12 microns, which allows for analysis of $CO_2$ as well as a variety of anesthetic agents. The optics 120 employed can vary depending on a variety of factors including the geometry of the instrument and may include lenses, filters and planar or curved mirrors. Preferably, the optics 120 include a lens or curved mirror for forming the illumination into a converging beam or imaging the source 110 onto the focal plane of the filter/detector unit 140 so as to enhance the optical efficiency of the instrument. It will be appreciated that some or all of the optical components may be located on the opposite side of the sample chamber 130 instead of on the same side as shown.

The sample chamber 130 can be located, for example, in a respiratory circuit flow line or in a side stream. In either case, a sample is drawn into the chamber 130 via input line 132 and exits the chamber 130 via exhaust line 134. In this manner, the sample stream allows for continuous or periodic monitoring of the gas composition during a medical procedure as desired. The sample chamber 130 preferably has substantially transparent windows at the forward and rearward walls to allow for transmission of the illumination and is dimensioned and shaped to provide desirable flow and optical pathlength characteristics. The gas exiting the sample chamber 130 may continue in the patient respiration line, or may be scavenged and vented to the ambient environment depending on instrument design.

The illustrated filter/detector unit 140 includes an LVF filter 142 and a linear array 144 of detector elements 146. The LVF 142 has filtering characteristics that substantially linearly vary from side-to-side of the LVF 142 such that different wavelengths or wavelength ranges of the illumination are passed at different portions of the filter. For example, the LVF can be formed by alternating layers of high index and low index of refraction materials, where the thickness of the layers are varied to impart the desired filtering characteristics. It will thus be appreciated that the various detector elements 146 receive illumination of differing wavelengths or wavelength ranges. More particularly, the element 146 at one end of the array 144 defines the shortest wavelength of the spectral range under analysis and succeeding elements 146 define progressively longer wavelengths or wavelength ranges, with the element at the opposite end defining the longest wavelength of the range under consideration. Any suitable elements 146 may be employed. The illustrated elements 146 are pyroelectric detectors that provide an electrical output proportional to the incident illumination based on heat generated due to the incident illumination. These outputs are transmitted to the processor 150, which may be a microprocessor based computer. The corresponding set of values defines a measured spectrum for the gas under consideration and, in the case of a multi-component sample gas, defines a composite measured spectrum. The processor 150 executes the dynamic calibration process described in detail below, among other things.

The number and type of elements 146 in the array 144 affects the spectral resolution of the instrument and the applicability of the dynamic calibration process described below. In the latter regard, the calibration process of the present invention involves treating the measured spectrum as a time-domain signal and conducting a Fourier transformation on the spectrum/signal. As is well-known, the applicability of such a transformation with regard to a time-domain signal depends on the relationship between the sampling rate of the signal to the frequency content of the signal. In particular, the Nyquist sampling criteria specifies that the following condition must be met in order to avoid losing signal information:

$$f_c \geq 2B$$

where $f_c$ is the sampling rate and B is the maximum frequency component of the signal.

In the present case, the Nyquist sampling criteria will be satisfied for a given number of detector elements 146 if either the gas under consideration has a sufficiently smooth spectrum or the function defined by the detector element outputs (which is based on but different from the gas spectrum) is sufficiently smooth. The illustrated filter/detector unit 140 has approximately 70–80 pyroelectric detector elements 146 and has been found to provide a suitable output function for Fourier analysis with respect to the components of interest for respiratory and anesthetic gas monitoring.

FIG. 2 shows a Raman spectrographic gas analyzer 200. The analyzer 200 provides composition information based on illumination scattered by a sample gas. Generally, the analyzer 200 includes at least one laser 210 for directing a beam of coherent illumination through sample chamber and detector 220, and a processor 230. The laser 210 may comprise, for example, a gas laser having a primary lasing line or lines (in the case of a tunable laser). In addition to these primary lines, the laser 210 emits a number of plasma glow lines defining constant wavelength outputs. Sample chamber and detector 220 includes sample chamber 226 and diffraction grating 228. Sample gas enters the chamber 226 through input line 222 and exits through exhaust line 224 as described above. Illumination scattered by the sample gas in chamber 226 is detected via diffraction grating 228. The resulting output can be analyzed in a well-known manner by processor 230 to yield composition information regarding the sample gas.

Figure 3:
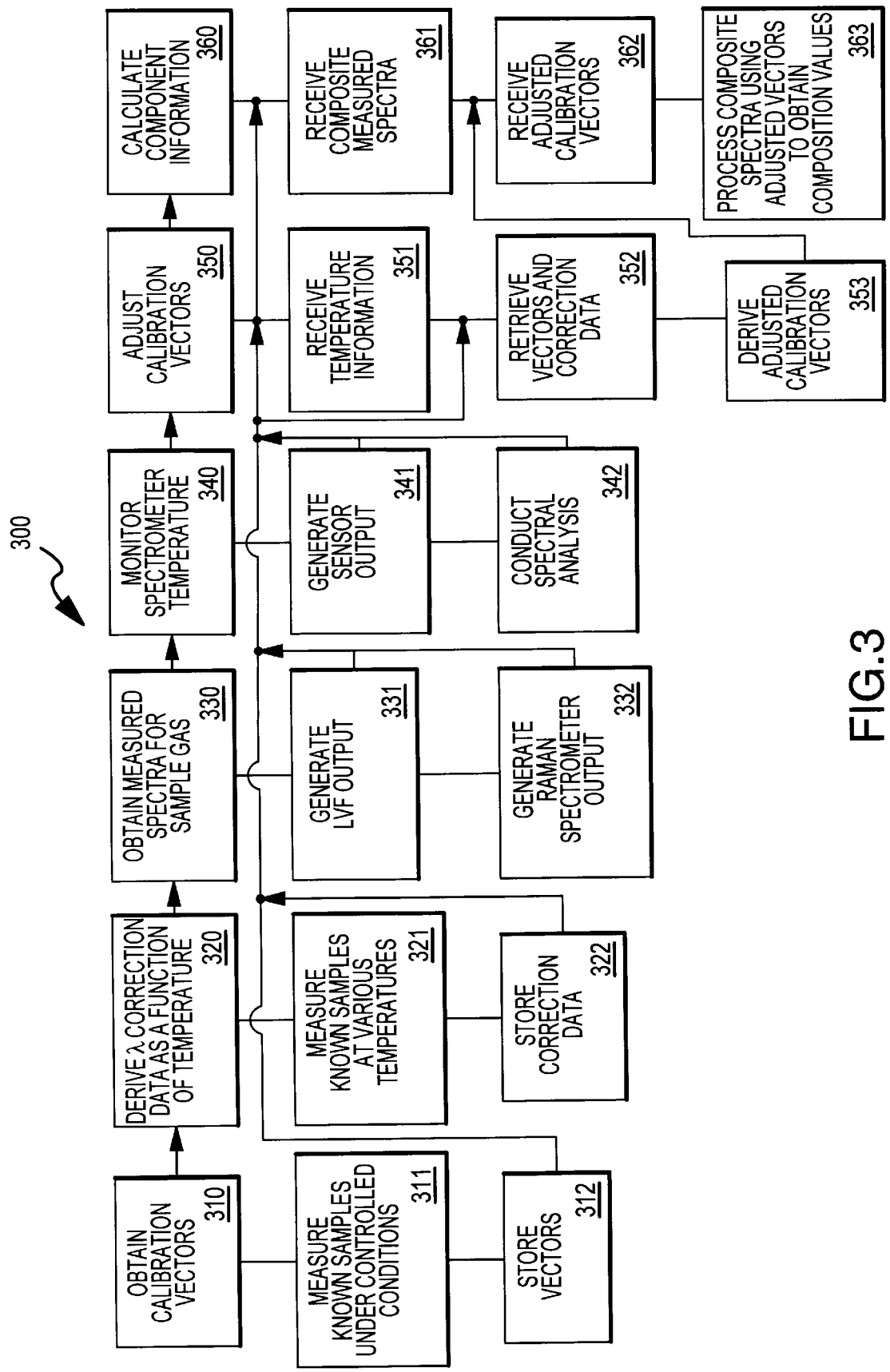
FIG. 3 is a flow diagram/chart showing various implementation options and details for the process of the present invention.

As noted above, the implementation of the dynamic calibration process of the present invention may vary in certain respects depending on the type of spectrographic instrument involved. FIG. 3 illustrates various options and details of the dynamic calibration process, which is generally identified by the reference numeral 300. The illustrated calibration process (300) is executed by the processors as shown in either of the analyzers illustrated above. It will be appreciated that the particular sequence illustrated may be varied, and certain steps may be eliminated in accordance with the present invention. The process 300 is initiated by obtaining (310) calibration vectors for various components of the multi-component gas sample. The calibration vectors are used to assist in resolving interfering effects of multiple components to yield individual component information. The calibration vector for a particular component can be any set of values or algorithms that can be applied to a composite measured spectrum to yield information regarding an individual component or components.

Figure 4:
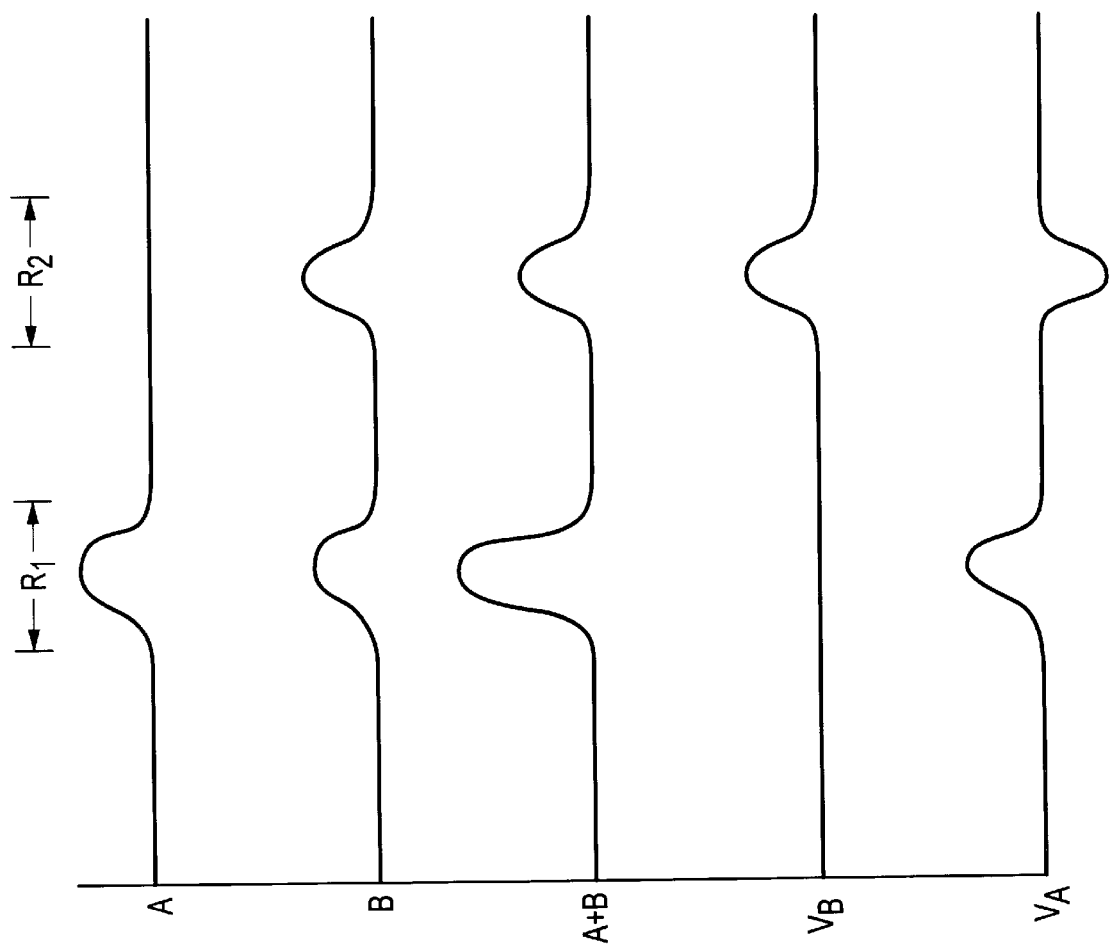
FIG. 4 illustrates a number of measured spectra and calibration vectors such as employed in the calibration process of the present invention.

One example of the vector function is illustrated graphically in FIG. 4. Referring to FIG. 4, the curve designated A represents a measured spectrum for an idealized component A. Such a measured spectrum may be defined, for example, by the output of the LVF filter/detector unit. Curve B represents a similar spectrum for idealized component B. It will be appreciated that the forms of the illustrated spectra have been simplified for purposes of illustration. Similar diffraction related curves may be produced using a scatter-based system. As can be seen, the measured spectra A and B include a region of peak area overlap, $R_1$, and a region, $R_2$, that is specific to component B, i.e., substantially free from overlapping interference. Curve $V_B$ illustrates a vector that may be employed to isolate or distinguish the effects due to component B from a composite measured spectrum of sample A+B. For example, a product or sum of A+B and $V_B$ may be employed to yield an adjusted spectrum where the effects of interfering region $R_1$ are minimized relative to the component B specific region $R_2$, thereby allowing for ready determination of information regarding component B, i.e., concentration. In this regard, the resulting adjusted vector can be integrated over a wavelength range including $R_2$ to yield a value corresponding to a known composition of B as determined empirically through other calibration processes. Similarly, a product or sum of A+B and the vector for component A, $V_A$, may be employed to determine information regarding component A.

Referring again to FIG. 3, the process for obtaining such vectors in the illustrated implementation involves measuring (311) known samples under controlled conditions. In order to derive appropriate vectors for use in distinguishing the effects due to the various components, it is useful to know what the spectral response is for the individual components under known conditions. Accordingly, a particular instrument can be calibrated by obtaining measured spectra for known concentrations of the individual components at known temperatures. These measured spectra are analyzed to derive appropriate vectors for the components of interest which are then stored (312).

Figure 5:
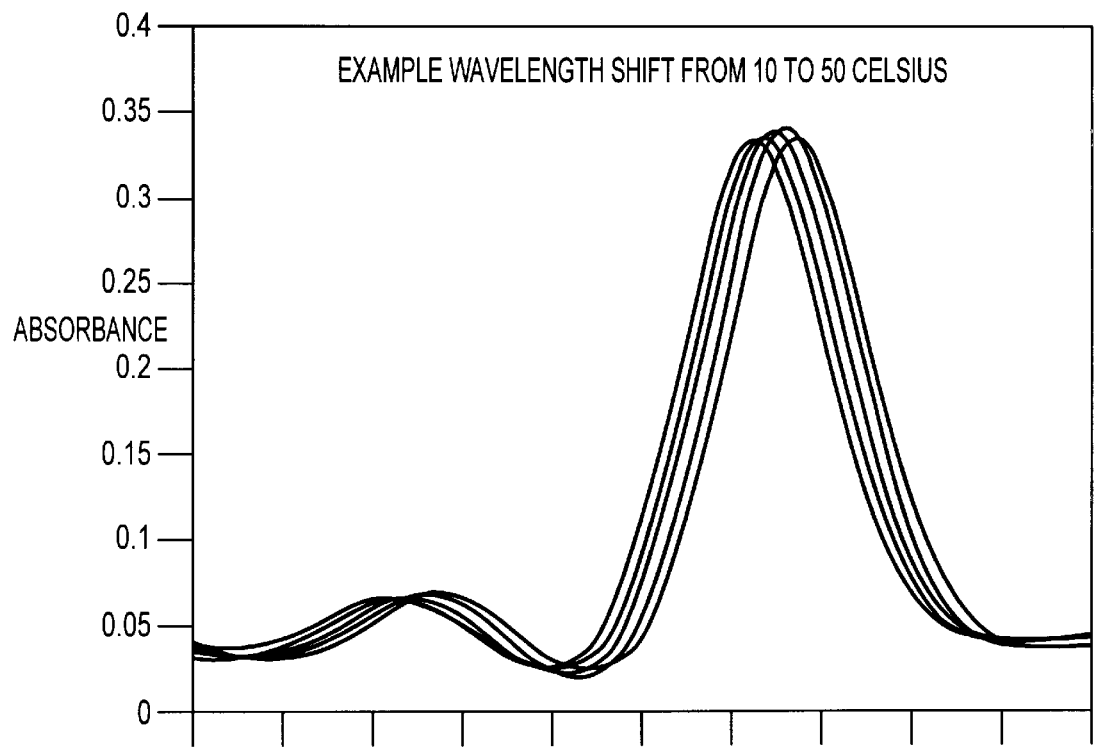
FIG. 5 shows a number of measured spectra obtained at various temperatures and thus illustrates temperature-related drift.

In one implementation of the invention, the process 300 also involves deriving (320) wavelength correction data as a function of temperature. In the case of the LVF spectrometer, for example, wavelength measurements may drift as temperature changes due to slight thermal expansions or other dimensional/geometric variations. Such drifting is graphically shown in FIG. 5 which shows several spectra obtained at temperatures ranging from 10–50° C. It will be noted that the various measured peaks and troughs vary as a function of temperature. This relationship can be theoretically derived or can be empirically modeled for a particular analyzer by performing measurements of a given sample at two or preferably more temperatures so as to obtain wavelength drift or correction data as a function of temperature. In the case of Raman spectrometers or other instruments employing a laser, temperature related drift can be identified by monitoring movement of plasma glow lines. This correction data is then stored (322) for later use.

Figure 6C:
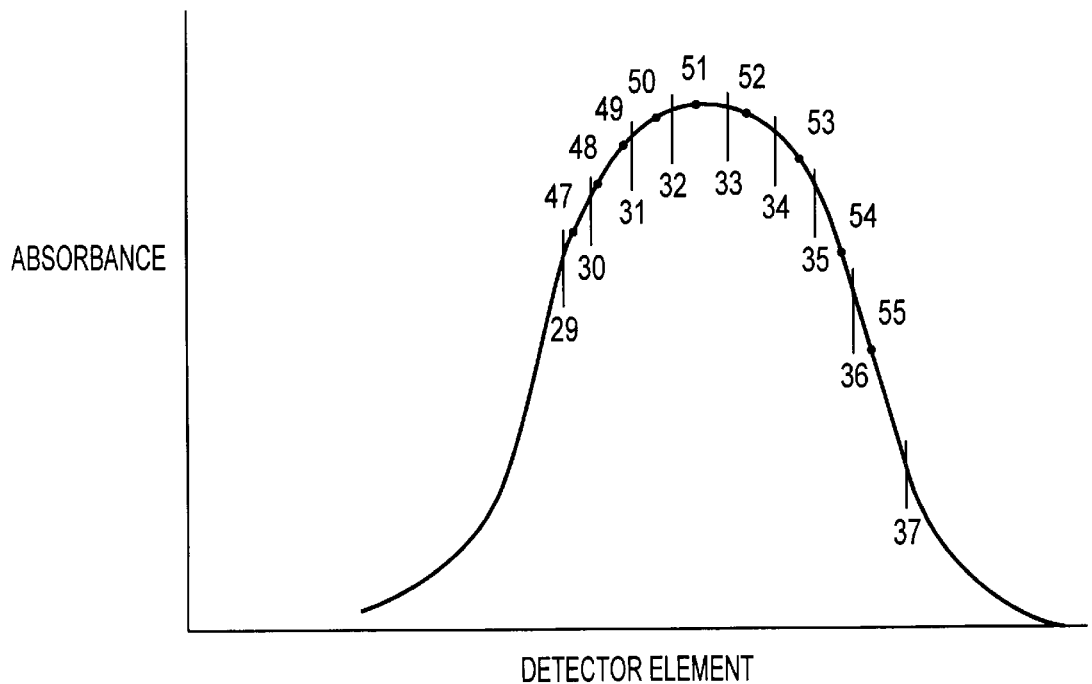
FIGS. 6A–6C illustrate a process for deriving temperature related correction data.
Figure 6A:
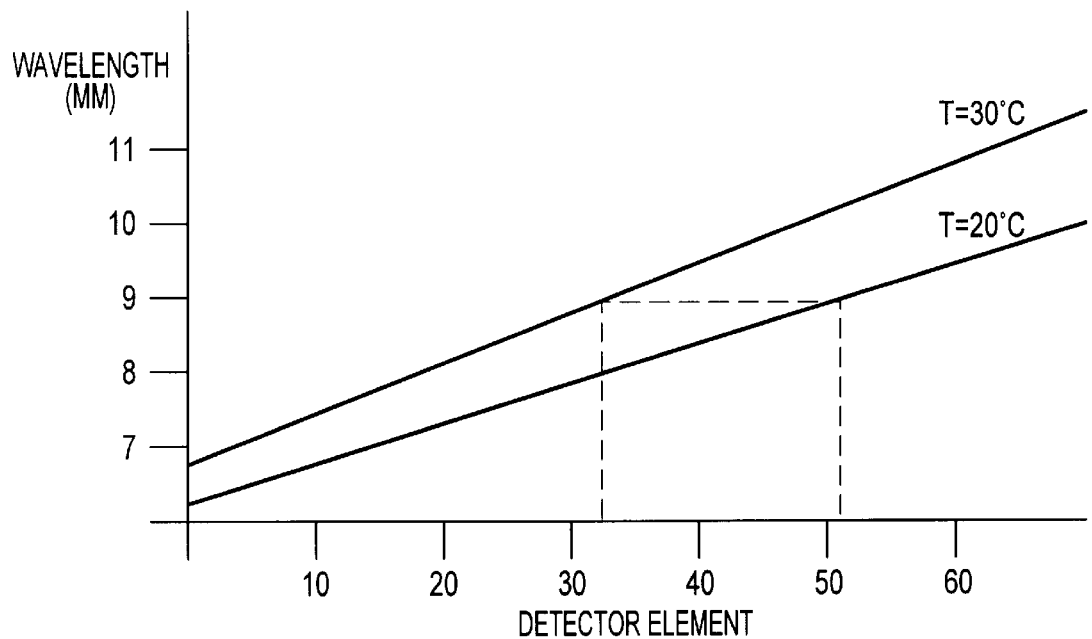
Figure 6B:
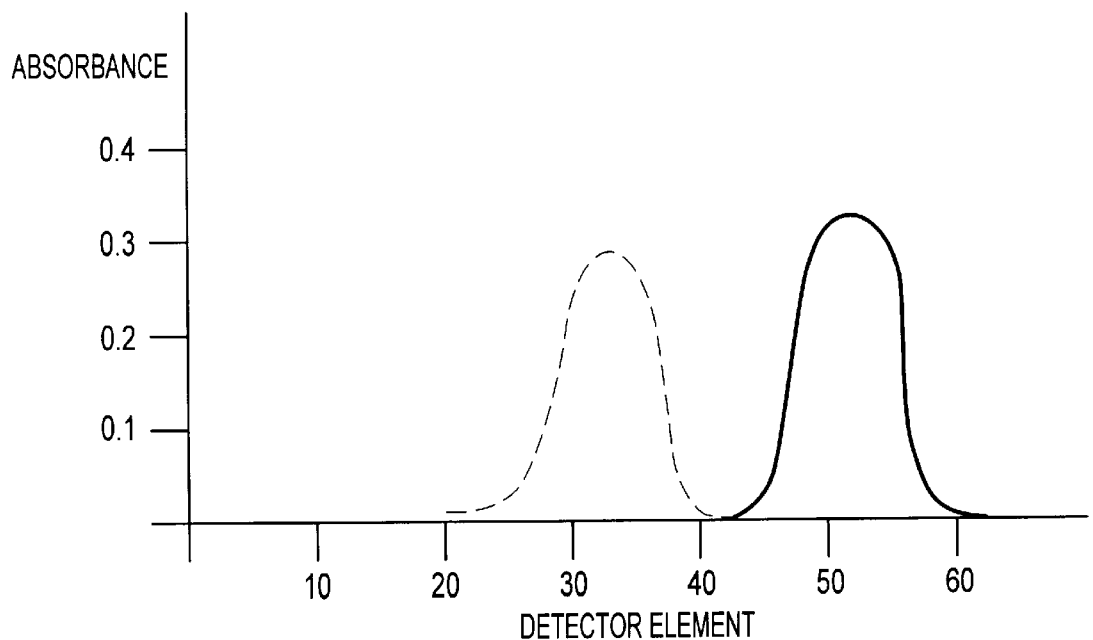

One process for deriving wavelength correction data can be understood by reference to FIGS. 6A–6C. The process is illustrated in the context of an LVF spectrometer including multiple detector elements for detecting illumination in the 7–10 micrometer wavelength range. It will be appreciated that illustrated temperature related wavelength shift is somewhat greater than typical for purposes of illustration.

In particular, FIG. 6A illustrates a temperature related shift in the relationship between the detector element number of the detector array and the corresponding detected wavelength or wavelength range. Such a shift may occur, for example, due to slight changes in instrument geometry or dimension accompanying temperature changes. Thus, as shown, illumination having a center wavelength of about 9 micrometers may be received by approximately element 32–33 at a detector temperature of 30° C. and the same illumination may be received by about element 51 when the detector temperature is 20° C.

FIG. 6B shows a corresponding shift of a measured peak for a given sample. As shown, the sample includes a measured absorbance peak at about detector element 51 for a detector temperature of 20° C. The same measured absorbance peak occurs at about detector element 32–33 for a detector temperature of 30° C. The same peak shift is shown graphically in FIG. 6C where the detector numbers corresponding to a detector temperature of 20° C. are shown above the peak curve and the detector numbers corresponding to a detector temperature of 30° C. are shown below the curve.

The derived correction data compensates for such temperature related shifts. In this regard, many different processes could be utilized to derive the correction data. For example, for applications where an approximation with a certain degree of error can be tolerated, the temperature correction may simply entail an algorithm or look up table for effectively shifting a vector or vectors such that, for example, the vector value corresponding to either detector element 32 or 33 for a detector temperature of 30° C. is processed the same as the value corresponding to detector element 51 for a detector temperature of 20° C. Greater accuracy may be obtained by incorporating a process for linear or non-linear inter-element interpolation such that, for example, a 20° C. value for element 51 may be processed to correspond to a 30° C. value for a processed detector output designated as element 32.6.

For greater accuracy, the process for deriving correction data may involve a curve fitting analysis. In this regard, for example, a first curve with a first known mathematical function can be fitted to the various detector element values for a given sample at a first detector temperature such as 20° C. A second curve with a second known mathematical function can be fitted to the various detector element values for the same given sample at a second detector temperature such as 30° C. Similar functions can be derived for other temperatures empirically or theoretically mathematically. Correction data for a shift from a first temperature to a second temperature can then be determined mathematically based on knowledge of the corresponding functions for the first and second temperatures. It will be appreciated that such a curve fitting process increases accuracy by reliably projecting inter-element values based on measured values, e.g., projecting peak locations that may occur between detector elements.

During a medical procedure, the spectrographic analyzer is operated in conventional fashion to obtain (320) composite measured spectra for the sample gas. This may involve, for example, generating (331) LVF detector outputs or generating (332) Raman spectrometer outputs. In either case, such outputs comprise a series of values that define a curve or spectrum. The detectors may be read out, for example, at a frequency of 20 times per second. It will thus be appreciated that measurement data is acquired and processed at a substantial rate.

The spectrometer temperature is also monitored (340) during the medical procedure to obtain drift related information. This can be done directly or indirectly. Direct monitoring involves providing a sensor or thermometer in or near the spectrometer to measure temperature. The sensor then generates (341) outputs, continuously or periodically, for use in accounting for expected wavelength drift. Alternatively, a spectral analysis may be conducted (342) on measured values to identify drifts that are indicative of temperature change. For example, the location of a plasma glow line may shift during a medical procedure indicating variation in temperature or another parameter. Alternatively, an identifiable spectral characteristic (e.g., a carbon dioxide peak) can be monitored for drift. Such information can be used to account for drift with respect to the measured composite spectrum as described below.

Based on the monitored temperature or a monitored change in temperature, the calibration vectors are adjusted (350) to account for wavelength drift. This involves receiving (351) temperature related information based on the monitored analyzer temperature, retrieving (352) the stored calibration vectors and correction data from memory, and deriving (353) adjusted calibration vectors by adjusting the stored vectors based on the correction data and monitored temperature. The adjusted calibration vectors are then stored as new calibration vectors to be used until a further temperature change is indicated.

The adjusted calibration vectors are then used to calculate (360) component information. In this regard, the processor receives (361) composite measured spectra, e.g., at a rate of 20 per second, receives (362) the adjusted calibration vectors, e.g., periodically or as required due to monitored temperature changes, and processes (363) the composite measured spectra using the adjusted calibration vectors to obtain composition values regarding one or more components of interest. In one implementation, such composition values are obtained by integrating the spectrum multiplied by the calibration vector for a selected component over the spectral range defined by the analyzer's detector output to obtain a value that is proportional to a known concentration of the selected component. It will be appreciated that the integrated value thus obtained is substantially independent of the location of extema (peaks and troughs) within the integrated range.

Upon reflection, it will be appreciated that adjusting the calibration vectors rather than the composite measured spectra to account for temperature-related wavelength shifts greatly reduces the computational intensity of the calibration process. As note above, composite measured spectra in a typical analyzer may be obtained at a rate of 20 times per second and include a substantial quantity of information. Temperature related adjustments to the calibration vectors can be made at a much lower frequency, e.g., once every 20–30 seconds or as necessary, without unacceptably compromising accuracy. Indeed, the processing required to implement the calibration process of the present invention can be executed as a low priority or background flnction in a multitasked computing system such that processor burden is reduced and substantially no dedicated processor resources are required for the calibration process.

While various implementations of the present invention have been described in detail, it is apparent that further modifications and adaptations of the invention will occur to those skilled in the art. However, it is to be expressly understood that such modifications and adaptations are within the spirit and scope of the present invention.

What is claimed:

1. A method for use in compensating for variation of a selected parameter in a spectrometer, comprising the steps of:

obtaining a calibration vector for at least one component of interest with respect to a multi-component sample;

deriving wavelength correction data as a function of said selected parameter for said spectrometer;

monitoring said spectrometer relative to said selected parameter during a time period of interest;

based on a monitored value of said selected parameter, adjusting said calibration vector using said derived wavelength correction data; and employing said adjusted calibration vector to obtain composition information regarding said multi-component sample so as to identify movement of a measured spectral characteristic.

2. A method as set forth in claim 1, wherein said step of obtaining comprises receiving and storing a previously derived vector.

3. A method as set forth in claim 1, wherein said step of obtaining comprises deriving said calibration vector based on measurements obtained under known conditions using said spectrometer.

4. A method as set forth in claim 3, wherein said measurements correspond to at least two values of said selected parameter.

5. A method as set forth in claim 1, wherein said step of deriving comprises determining a relationship between said selected parameter and measured wavelength values.

6. A method as set forth in claim 1, wherein said step of deriving comprises obtaining measurements for known samples using said spectrometer.

7. A method as set forth in claim 1, wherein said selected parameter is temperature and said step of deriving comprises obtaining a first measurement at a first temperature using said spectrometer and obtaining a second measurement at a second temperature using said spectrometer.

8. A method as set forth in claim 1, wherein said step of monitoring comprises employing a sensor to measure said parameter during said time period of interest.

9. A method as set forth in claim 1, wherein said spectrometer comprises a laser and said identified spectral characteristic corresponds to a plasma glow line.

10. A method as set forth in claim 1, wherein said identified spectral characteristic comprises an extremum associated with a known component of said multi-component sample.

11. A method as set forth in claim 1, wherein said step of adjusting comprises shifting said calibration vector based on said monitored value.

12. A method as set forth in claim 1, wherein said step of adjusting comprises shifting said calibration vector based on a change in said monitored value.

13. A method as set forth in claim 1, wherein said step of employing comprises obtaining a composite measured spectrum for said multi-component sample and mathematically processing said composite measured spectrum using said adjusted calibration vector.

14. A method as set forth in claim 13, wherein a calibrated spectrum is obtained by said step of mathematically processing, and said step of employing further comprises integrating said calibrated spectrum to obtain a value related to a particular component of said multi-component sample.

15. A method for use in compensating for variation of a parameter affecting an analysis of a multi-component sample, said analysis employing an isolation process for obtaining sample composition information relating to individual components of the sample based on a composite measurement of a multi-component sample, wherein said isolation process involves a calibration vector and said composite measurement for said multi-component sample, said method comprising the steps of:

obtaining a calibration vector based on a calibration procedure, wherein said calibration vector reflects a calibration value of said parameter relative to said calibration procedure;

determining an actual value of said parameter, said actual value being based on a measurement obtained at a time of interest relative to said analysis; and adjusting said calibration vector to compensate for a difference between said calibration value and said actual value of said parameter wherein said step of determining comprises employing a spectrometer to monitor movement of a measured spectral characteristic.

16. A method as set forth in claim 15, wherein said parameter is temperature and said step of adjusting comprises shifting said vector to compensate for a difference between a temperature corresponding to the calibration vector and a measured temperature.

17. A method as set forth in claim 15, wherein said step of obtaining comprises operating a spectrometer to perform measurements of known samples.

18. A method as set forth in claim 15, wherein said step of determining comprises employing a sensor to measure said parameter during said time of interest.

19. A method as set forth in claim 15, whether said spectrometer comprises a laser and said spectral characteristics correspond to a plasma glow line of said laser.

20. A method as set forth in claim 15, further comprising the step of deriving measurement correction data as a function of said parameter.

21. A method as set forth in claim 15, further comprising the step of employing said adjusted calibration vector to obtain composition information regarding said multi-component sample.

22. A method for use in calibrating a spectrometer for determining composition information regarding a sample comprising the steps of:

obtaining a first spectrometer measurement relating to a laser at a known value of a given parameter;

employing said spectrometer to identify a first location of a spectral characteristic relative to said first spectrometer measurement;

employing said spectrometer to identify a second location of said spectral characteristic relative to a second spectrometer measurement, wherein said spectrometer is used to monitor movement of said spectral characteristic; and using said first location and said second location in an analysis to determine said composition information regarding said sample.

23. A method as set forth in claim 22, wherein said step of obtaining comprises measuring illumination corresponding to a plasma glow line of said laser.

24. A method as set forth in claim 23, wherein said step of obtaining comprises selecting said plasma glow line such that said plasma glow line is substantially free from interference from said sample.

25. A method as set forth in claim 22, wherein said parameter is temperature.

26. A method as set forth in claim 22, wherein said second spectrometer measurement is taken at a time of interest relative to analysis of said sample.

* * * * *